United States Patent
Bayer et al.

(10) Patent No.: US 7,371,279 B2
(45) Date of Patent: May 13, 2008

(54) CELLULOSE ETHER COMPOSITION

(75) Inventors: Roland Bayer, Walsrode (DE);
Hartwig Schlesiger, Walsrode (DE);
Daniel Auriel, Bad Fallingbostel (DE)

(73) Assignee: Dow Wolff Cellulosics GmbH, Bomlitz (DE)

( * ) Notice: Subject to any disclaimer, the term of this patent is extended or adjusted under 35 U.S.C. 154(b) by 0 days.

(21) Appl. No.: 11/475,406

(22) Filed: Jun. 27, 2006

(65) Prior Publication Data
US 2007/0004826 A1    Jan. 4, 2007

(30) Foreign Application Priority Data
Jun. 30, 2005    (DE) .................. 10 2005 030 521

(51) Int. Cl.
*C04B 24/38* (2006.01)

(52) U.S. Cl. .............. 106/805; 106/172.1; 106/711; 106/729; 106/780; 524/2; 524/5; 524/42; 524/43; 524/44; 524/45; 524/46

(58) Field of Classification Search ........... 106/172.1, 106/711, 729, 780, 805; 524/2, 5, 42, 43, 524/44, 45, 46
See application file for complete search history.

(56) References Cited

U.S. PATENT DOCUMENTS 7,041,168 B2 * 5/2006 Schlesiger et al. .......... 106/805

| 2002/0019465 A1* | 2/2002 | Li et al. ............... 524/2 |
| 2004/0259983 A1 | 12/2004 | Okazawa et al. |
| 2005/0016422 A1 | 1/2005 | Kamada et al. |
| 2005/0080167 A1 | 4/2005 | Bayer et al. |
| 2005/0080290 A1 | 4/2005 | Gulevich et al. |
| 2005/0241540 A1 | 11/2005 | Hohn et al. |
| 2005/0241543 A1* | 11/2005 | Hagen et al. .......... 106/805 |
| 2006/0032409 A1 | 2/2006 | Okazawa et al. |

FOREIGN PATENT DOCUMENTS

| EP | 1 266 877 | 12/2002 |
| EP | 1426349 | 6/2004 |
| EP | 1506973 | 2/2005 |
| EP | 1506979 | 2/2005 |
| JP | 8225355 | 9/1996 |
| WO | WO-01/16048 | 3/2001 |
| WO | WO-03/024884 | 3/2003 |
| WO | WO-2005/080290 | 9/2005 |

OTHER PUBLICATIONS

Webster's New World Dictionary, Third College Edition, 1998, Simon&Schuster, p. 483.*

* cited by examiner

*Primary Examiner*—David M. Brunsman

(57) ABSTRACT

A composition comprising cellulose ether, a superplasticizer and defoamer suitable for use as an additive in extruding inorganic compositions is disclosed. The inventive composition functions as a water retention agent, plasticizer and lubricant in the extrusion of inorganic compositions. The use of the inventive composition in the extrusion of building materials leads to improved processing properties, to a higher surface quality and product properties of the extruded article.

18 Claims, No Drawings

CELLULOSE ETHER COMPOSITION

FIELD OF THE INVENTION

The invention relates to cellulose ether composition and to its use in extrudable inorganic composition containing the same.

BACKGROUND OF THE INVENTION

The invention relates to cellulose ether composition for use as a water retention agent, plasticizer and lubricant in the extrusion of inorganic compositions. In addition, the invention relates to the use of this cellulose ether composition in building materials and other mixtures, and also to a process for the extrusion of inorganic compositions using these additives. The use of this methylcellulose composition leads to improved processing properties, to a higher surface quality of the extruded body, and also to improved product properties of the extruded article.

The extrusion of inorganic compositions has been employed for many years; it is a process for shaping pasty inorganic mixtures into any desired profiles by pressing through a die. The articles thus obtained may be used in many ways, in particular in construction applications. Extruded inorganic compositions can have different constituents, those which are technically and economically important are, inter alia, extruded cement compositions. These contain in principle cement as binder, possibly also other binders, in addition aggregates (sands) and/or lightweight aggregates, possibly also constituents fibers and/or other additives, and also cellulose ethers, in particular methylcellulose, as water retention agents, plasticizers and lubricants.

Methylcellulose in the present context means all methyl-containing cellulose ethers such as methylcellulose, methylhydroxyethylcellulose, methylhydroxypropylcellulose, methylhydroxyethylhydroxypropylcellulose, methylethylhydroxyethylcellulose, methylhydroxyethylhydroxybutylcellulose, and also cellulose ethers which contain not only methyl groups but also longer-chain hydrophobic side chains. The amount of methylcellulose used is generally between 0.1 and 6%.

Whether a composition, from the aspect of economic efficiency, may be extruded and processed to produce high quality products with good marketability is determined by different parameters:

Processing parameters: the composition must be able to be discharged homogeneously from the die at the lowest possible pressure and also at the highest possible rate. In addition, after exit from the die, it should have the lowest possible deformation (broadening at the die, width expansion) transversely to the direction of discharge.

Product properties: the surface of the extruded composition plays a critical role. It should be crack-free and as smooth as possible. Good surface properties are a problem especially at relatively high extrusion temperatures which are customarily established after relatively long extrusion time. Elevated strengths or faster setting of the extruded products may be further desirable properties.

Correspondingly, the object underlying this invention is to find a composition that imparts to the extrudable composition improved surface quality and the physical properties.

WO 01/16048A1 (James Hardie) describes a mixture of viscosity-increasing agents (as such, inter alia, various cellulose ethers are named) and dispersants (as such, sulphonated melamin-formaldehyde resins are named, and also polycarboxylates, which are customarily termed superplasticizers) as additive in extruded cement compositions having the purpose of achieving a possibility for savings of cellulose ether by a synergy between the two components. In addition, advantages such as better surface, lower extrusion pressure and at times increased extrusion rate are reported. WO 01/16048A1, however, gives no indication to a person skilled in the art that the subsequently described inventive mixture of three components, namely cellulose ether, superplasticizer and defoamer in certain ratios, despite a set water requirement (regulated to the same consistency) of the extruded composition gives the six advantages mentioned below.

EP1266877A2 (Shin-Etsu) discloses a hydraulically binding mixture which, inter alia, comprises a thickener (cellulose ether) and an defoamer (containing polyether groups or polyether components). It is observed that the linear width broadening of the discharged composition at the die ("spring back") is reduced. However, the mixtures according to EP 1266877 A2 give very stiff compositions having poor extrusion properties.

WO 03/024884 A1 (Shin-Etsu and NMB) describes mixtures of polycarboxylic acid copolymer and/or a salt thereof with water-soluble cellulose ethers and an defoamer. The mixing ratio between the first and second components, between polycarboxylic acid copolymer or salts thereof and the cellulose ether, is preferably 50:50 to 99:1. The high storage life of the liquid mixture of the three components is particularly emphasized.

SUMMARY OF THE INVENTION

A composition comprising cellulose ether, a superplasticizer and defoamer suitable for use as an additive in extruding inorganic compositions is disclosed. The inventive composition functions as water retention agent, plasticizer and lubricant in the extrusion of inorganic compositions. The use of the inventive composition in the extrusion of building materials leads to improved processing properties, to a higher surface quality and product properties of the extruded article.

DETAILED DESCRIPTION OF THE INVENTION

However, it has been found that in the extrusion of cement-bound compositions, the ratios recommended in WO 03/024884 A 1 of the three components to one another and to the binder cement are unsuitable.

It has now been found that adding to certain organic compositions a mixture containing specific amounts of cellulose ether, polycarboxylate ether—liquefier and defoamer leads to the following advantages, namely:

to a lower extrusion pressure,
to a higher extrusion rate,
to lower broadening of the extruded profile after exit from the die ("linear width expansion" in %),
to a greater cohesion of the extruded composition, accompanied by higher ductility and plasticity of the composition,
to smoother surfaces having lower crack formation, and
to higher compressive and flexural strengths.

These advantages are attained by use of the inventive composition that contains 55-99.8% by weight of cellulose ether (A), 0.19-45% by weight of superplasticizer (B) and 0.01-25% by weight of defoamer (C), preferably 58-99.5% by weight of cellulose ether, 0.45-41.95% by weight of superplasticizer and 0.05-22% by weight of defoamer, very particularly preferably 60-99% by weight of cellulose ether, 0.9-39.9% by weight of superplasticizer and 0.1-20% by weight of defoamer, the percentages by weight in each case being based on the sum of the components (A), (B) and (C).

The invention therefore relates to a cellulose ether composition as additive for the extrusion of inorganic compositions containing (A) 55-99.8% by weight cellulose ether, (B) 0.19-45% by weight of superplasticizer and (C) 0.01-25% by weight of defoamer.

In a preferred embodiment of the invention the composition is in powder form.

The use of these three components in a ratio other than that claimed does not lead to the described inventive results.

Preferably, the mixing ratio between superplasticizer and cellulose ether is 30:70 to 1:99, particularly preferably 35:65 to 1.5:98.5, very particularly preferably 40:60 to 2:98, the stated ratios relating to parts by weight.

Preferably, the fraction of defoamer, based on cellulose ether, is: 0.05-20% by weight, particularly preferably 0.1-15%, very particularly preferably 0.15-5% by weight.

Typically, the inventive cellulose ether composition is used in an amount of 0.1-6% by weight, based on the inorganic composition.

If the inorganic composition is based on cement, the fraction of superplasticizer is customarily 0.01 to 4% by weight, preferably 0.01 to 3% by weight, particularly preferably 0.015 to 2% by weight, based in each case on cement. The fraction of cellulose ether is customarily 0.05 to 10% by weight, preferably 0.08 to 7% by weight, particularly preferably 0.1 to 5% by weight, based on cement.

Suitable cellulose ethers (A) include ionic cellulose ethers such as sulphoethylcellulose or carboxymethylcellulose and salts thereof, or nonionic cellulose ethers, such as alkylcelluloses, hydroxyalkylalkylcelluloses or hydroxyalkylcelluloses, in particular methylcellulose, methyl-hydroxyethylcellulose, methylhydroxypropylcellulose, hydroxyethylcellulose, ethylhydroxyethylcellulose, methylethylhydroxyethylcellulose, methylhydroxyethylhydroxypropylcellulose, methyl-hydroxyethylhydroxybutylcellulose or cellulose ethers which simultaneously contain methyl groups and longer-chain hydrophobic side chains, and also mixtures of the above mentioned products.

The viscosities of the above mentioned cellulose ethers are generally between 400 and 200 000 mPas, measured in 2% strength solution at 20° C. in a Haake rotary viscometer.

Suitable superplasticizers (B) include casein, polycarboxylic acids and salts thereof, polymers which contain not only carboxylic acid monomers or salts thereof, but also carboxylate ether monomers, carboxylic acid ester monomers, and other carboxylic acid derivative-crosslinking bisacrylates and similar monomers. Preferably, the superplasticizers are taken to be: homo-, co- and terpolymers of acrylic, methacrylic, crotonic, maleic, fumaric acid and similar mono- and bifunctional acids and also their salts, esters and ethers. The ethers comprise, for example, polyalkylene glycol mono(meth)acrylates such as triethylene glycol monoacrylate and polyethylene glycol monoacrylate (having a polyethylene glycol molecular weight of 200-2000 g/mol), but also unsaturated polyalkylene glycol ethers without an acid group. Very particular preference is given to: homo-, co- and terpolymers of acrylic and methacrylic acid, their bifunctional acids and also their salts, esters and ethers. The ethers comprise, for example, polyalkylene glycol mono (meth)acrylates, such as triethylene glycol monoacrylate and polyethylene glycol monoacrylate (having a polyethylene glycol molecular weight of 200-2000 g/mol), but also unsaturated polyalkylene glycol ethers without an acid group.

Superplasticizers in the present context exclude the class of melamine or melamine-formaldehyde sulphonates, naphthalene sulphonates, lignosulphonates or mixtures thereof.

Particularly preferred superplasticizers are polycarboxylic acid copolymers and salts thereof.

Suitable defoamers (C) include pure substances or mixtures in liquid or solid form which contain the following: alkylene glycol homopolymers, copolymers, terpolymers and block copolymers, for example based on ethylene oxide or propylene oxide, adducts of alkylene oxides, alkylene glycol ethers of higher alcohols, fatty acid esters, alkylene glycol fatty acid esters, sorbitol fatty acid esters, polyoxyalkylenesorbitol fatty acid esters, addition products of ethylene oxide and propylene oxide and acetylene, phosphate esters such as tributyl phosphate, sodium octyl phosphate and the like, and also all polyether-containing compounds or polyether-containing mixtures having defoamer action.

Particular preference is given to alkylene glycol-homopolymers, copolymers, terpolymers and block copolymers, for example based on ethylene oxide or propylene oxide, adducts of alkylene oxides, alkylene glycol ethers of higher alcohols, fatty acid esters, alkylene glycol fatty acid esters and the like and also all polyether-containing compounds or polyether-containing mixtures having defoamer action.

Very particular preference is given to alkylene glycol-homopolymers, copolymers, terpolymers and block copolymers, for example based on ethylene oxide or propylene oxide, adducts of alkylene oxides, alkylene glycol ethers of higher alcohols and also all polyether-containing compounds or polyether-containing mixtures having defoamer action.

The cellulose ether composition, in addition to the said components (A) to (C), may also contain further additives, for example hydrophobizing agents, redispersion powders, superabsorbers based on crosslinked acrylates and polysaccharides, lubricants (for example polyethylene oxide-homopolymers, copolymers and terpolymers), surfactants, accelerators, retardants, fatty acids and esters thereof, polymers based on acids, salts, amides and esters of acrylic acids and methacrylic acids, polysaccharides such as natural or derivatized starches, xanthans, glucans, welans, guar and related polysaccharides, polyvinyl alcohols including their derivatives and polymers based on urethanes.

In a typical use, the inventive cellulose ether composition is added to a mixture of inorganic components which consists of 20-100 parts of binder, 0-70 parts of aggregates, 0-30 parts of lightweight aggregates, 0-20 parts of fibers and possibly other additives, in an amount of 0.1-3% by weight, based on the mixture of inorganic components.

Binders here are taken to mean all inorganic binders such as cement, gypsum, hydradet lime, burnt lime, clay, silicates, especially fly ashes and ceramic binders, but preferably all types of cement and gypsum and dispersion-bound binders and ceramic compositions.

Aggregates here are taken to mean all types of sands and stone flours as are customarily used in building materials. These are, in particular, gravels, crushed sands and round-grain sands, stone chippings, ashes and flours based on quartz, lime (calcium carbonate), dolomite, kaolin, marble, glass, various types of building rubble, recycling material, especially fly ashes, clays, bentonites and other sheet silicates. In principle, aggregates of the most different particle sizes may be extruded, it is possible when composing the aggregates in accordance with the profile of requirements to combine certain grain size fractions with one another in order to set certain properties optimally.

Lightweight aggregates are aggregates having particularly low density. These can be of mineral origin, for example perlites (expanded clay), expanded glass, expanded calcium silicates or high-porosity natural sands based on quartz or lime, but they can also be of organic origin, such as expanded polystyrene, polyurethane foam, cork etc.

Fibers here are taken to mean all types of natural or synthetic fibers, for example fibers based on cellulose, bamboo, coconut, polyethylene, polypropylene, polyamide, polyacrylonitrile, carbon, glass, ceramics and other mineral fibers. Their fiber lengths and thicknesses can be varied over wide ranges in order to achieve certain product properties.

The addition to the cellulose ether mixture (of cellulose ethers, polycarboxylate ether superplasticizers and defoamer) need not proceed in a separate step, but the at least three individual components can also be individually mixed with the other mortar constituents.

The invention further relates to a process for the extrusion of inorganic compositions, with admixture of the above-described cellulose ether composition to the extruded composition. Subject-matter of the invention here is a process for the extrusion of inorganic compositions, characterized in that an inventive cellulose ether composition is mixed with water in an amount of 0.1 to 3% by weight of a mineral mixture consisting of 20 to 100 parts of binder, 0 to 70 parts of aggregates, 0 to 30 parts of lightweight aggregates, 0 to 20 parts of fibers and possibly other additives, admixed and/or kneaded until a homogeneous composition is obtained, and the composition is extruded through a die of an extrusion press.

The inventive process is carried out by mixing together all raw materials in any desired sequence. Generally, all dry components are first premixed dry, then admixed with a certain amount of water, and mixed again. However, it is also possible to admix the dry materials with an aqueous solution of the cellulose ether mixture (but this will in general lead to a gel which is difficult to incorporate) or to mix all of the components and water simultaneously. It is likewise possible to admix a part or all of sand/aggregates having moisture content of less than 10%. After all components have been mixed together, they are then compressed in a single or twin-shaft extruder and expressed through a die. It is possible to use extruders with and without vacuum chambers and extruders with or without cooling. A kneading step in a commercially conventional kneader may also be provided between mixing and extruding.

The invention further relates to a process for the production of a cellulose ether composition which is used as additive for the extrusion of mineral compositions, characterized in that (A) 55-99.8% by weight of cellulose ether, (B) 0.19-45% by weight of superplasticizer and (C) 0.01-25% by weight of defoamer, and if appropriate further additives, are mixed in the dry or pasty/gel-like state.

The invention further relates to the use of the inventive cellulose ether composition as additive for the production of cement-bound shaped twill by extrusion.

EXAMPLES

The examples hereinafter are intended to explain the inventive use without restricting the invention:

Carrying out the mixing and extruding: 50 parts of Portland cement CEM I 32,5R, 50 parts of quartz flour, 4.5 parts of fibers and 1 part of cellulose ether composition (all parts adjusted to the desired temperature) are first mixed homogeneously dry in a fluidized bed mixer, then heated water (for quantity data see below) is added, the composition is mixed further and kneaded for some min in a kneader. The composition is then immediately charged into the feed trough of the heated single-shaft extruder. The composition is pressed through a perforated plate and, for degassing, passed through the vacuum chamber, pressed through a profile die and discharged onto a conveyor belt. All inventively extruded compositions were, with respect to their water requirement, set to a customary consistency of the exiting composition, the non-inventive examples, alternatively, were also set to the water requirement of the reference as is carried out in the above-cited patent applications WO 01/16048A1, EP1266877A2 and WO 03/024884 A1.

Examples 1 to 10

Description of the Experimental Results:

Examples 1, 2 and 3: the cellulose ether compositions of Examples 2 and 3 show, compared with a pure cellulose ether (Example 1, not according to the invention), a considerable improvement with respect to pressure reduction, rate increase, surface quality, reduction of the linear expansion at the die, cohesion and flexural and compressive strength, although they are described as unsuitable in WO 03/024884 A1. The reverse is the situation with Examples 5-8. Here, Example 4 serves as reference for showing the measured values of a pure cellulose ether and for repeating the reference. It is found that mixtures of the three constituents in the ratios as are recommended in WO 03/024884 A1 in Examples 5 and 7 where the consistency of the composition was set to that of the reference, lead to a considerable impairment of the surface which is already a rejection criterion. If, in contrast, the composition is extruded with the same water requirement as the reference (Examples 6 and 8), then the composition is so soft that dimensional stability of the extrudate is no longer ensured, which in turn is a rejection criterion. Examples 9 to 14 serve to test the suitability of various defoamers in admixture with methylcellulose alone (in accordance with EP 1266877 A2). Examples 9 and 10 (defoamer T): at a W/S of 0.28, a composition which is too stiff results, and even when the W/S is increased to 0.30 (example 10), this falls only very slightly. Thus both compositions are unsuitable. The high water requirement of example 10, furthermore, allows very low strengths to be expected.

Examples 11 and 12

(defoamer Rhoximat DF 770 DD): at a (customary) W/S of 0.280 is too stiff, but if the W/S is increased to 0.305, to decrease the stiffness of the composition to the normal range, although good processing parameters result (pressure, rate, surface, broadening at the die), the high water requirement prevents acceptable strengths.

Examples 13 and 14

(Agitan P 803): similar observations as for the two preceding experimental pairs are made.

Examples 15 and 16 compared with the reference (containing 0.9% methylcellulose) in Example 15, Example 16, despite additional use of superplasticizer based on melamine sulphonate, shows no significant improvements, at the same water requirement in both batches, its softer composition was not even found in Example 16, proof of the low efficacy of superplasticizers based on melamine sulphonates.

Examples 17 and 18 the use of Melflux 2651 F, in contrast, shows a greater effect of water saving. However, when the water requirement is controlled to the correct consistency, a significant (disadvantageous) pressure increase is found and a slight impairment in surface quality.

| Example No. | Cellulose ether composition (A:B:C) (1) (R 1) | W/S (2) | Pressure (bar) (3) | Rate (cm/min) (4) | Surface (++ to --) | Linear expansion (%) (5) |
|---|---|---|---|---|---|---|
| 1 | 100:0:0 | 0.270 | 19-20 | 115 | + | 3.3 |
| 2 | 80:18.4:1.6 | 0.268 | 12-13 | 128 | ++ | 1.25 |
| 3 | 67:28:5 | 0.265 | 10-11 | 132 | ++ | 0.8 |
| 4 | 100:0:0 | 0.260 | 23-24 | 110 | + | 4.3 |
| 5 | 20:79.4:0.6 | 0.220 | 11-14 | 123 | -- | 0.8 |
| 6 | 20:79.4:0.6 (as Ref. No. 6) | 0.260 | 2-4 | 164 | - | n.d. |
| 7 | 5:94.5:0.5 | 0.215 | 12-18 | 91 | -- | 2.3 |
| 8 | 5:94.5:0.5 | 0.260 | 3 | n.m.d. | n.m.d. | n.m.d. |
| 9 | 90:0:10 | 0.280 | 22-24 | 113 | + | 2.3 |
| 10 | 90:0:10 | 0.30 | 19-23 | 116 | + | 1.5 |
| 11 | 90:0:10 | 0.28 | 20-22 | 121 | + | 1.8 |
| 12 | 90:0:10 | 0.305 | 12-13 | 135 | ++ | 1.0 |
| 13 | 90:0:10 | 0.290 | 16-17 | 117 | ++ | 1.5 |
| 14 | 90:0:10 | 0.305 | 12 | 125 | ++ | 1.5 |
| 15 | 100:0:0, but amount used 0.9% | 0.275 | 19-20 | 109 | + | 4.5 |
| 16 | 90:10:0 | 0.275 | 18-21 | 113 | Low poorer than + | 4.8 |
| 17 | 90:10:0 | 0.275 | 13-14 | 122 | n.m.d. (too soft) | n.m.d. |
| 18 | 90:10:0 | 0.265 | 20-21 | 107 | Poorer than + | 4.5 |

| Example No. | Stiffness (too stiff/good/too soft) (6) | Cohesion of the composition (+/0/-/--) (7) | Flexural strength (N/mm$^2$) (8) | Compressive strength (N/mm$^2$), (8) | Inventive with respect to component ratio 1, 2, 3 or 4 according to WO 03/024884 A1 or this application (7) |
|---|---|---|---|---|---|
| 1 | Good | 0 | 15.6 | 44.7 | Not inventive, reference |
| 2 | Good | + | 16.9 | 53.0 | Mixture according to the invention according to this application, described as unsuitable according to WO 03/024884 A1 (because of R 4) |
| 3 | Good | + | 16.2 | 50.9 | Mixture according to the invention according to this application described as unsuitable according to WO 03/024884 A1 (because of R 4) |
| 4 | Good | 0 | n.d. | n.d. | Not according to the invention, repetition reference |
| 5 | Good | - | n.d. | n.d. | Mixture described as suitable according to WO 03/024884 A1, not according to the invention according to this application |
| 6 | Too soft | Not meaningful, because too soft | n.d. | n.d. | Mixture described as suitable according to WO 03/024884 A1, not according to the invention according to this application |
| 7 | Good | -- | n.d. | n.d. | Mixture described as suitable according to WO 03/024884 A1, not according to the invention according to this application |
| 8 | n.m.d. (considerably too soft) | Composition considerably too soft, not able to be assessed | n.d. | n.d. | Mixture described as suitable according to WO 03/024884 A1, composition not transportable, not inventive according to this application |
| 9 | Too stiff | - | n.d. | n.d. | Not inventive according to this application, inventive according to EP 1266877 A2 |
| 10 | Too stiff | - | n.d. | n.d. | Not inventive according to this application, inventive according to EP 1266877 A2 |
| 11 | Too stiff | 0 | n.d | n.d. | Not inventive according to this application, inventive according to EP 1266877 A2 |
| 12 | Good | 0 | 13.1 | 37.1 | Not inventive according to this application, inventive according to EP 1266877 A2 |
| 13 | Too stiff | 0 | n.d. | n.d. | Not inventive according to this application, inventive according to EP 1266877 A2 |
| 14 | Good | 0 | 13.9 | 38.8 | Not inventive according to this application, inventive according to EP 1266877 A2 |
| 15 | Good | 0 | 13.8 | 40.3 | Not inventive according to this application, inventive according to WO 01/16048 A1 |

-continued

| 16 | Good | 0 | 14.8 | 44.6 | Not inventive according to this application, inventive according to WO 01/16048 A1 |
| 17 | Too soft | 0 | n.m.d. | n.m.d. | Not inventive according to this application, inventive according to WO 01/16048 A1 |
| 18 | Good | 0 | 15.6 | 47.3 | Not inventive according to this application, inventive according to WO 01/16048 A1 |

Notes:
A: methylcellulose, B: superplasticizer, C: defoamer, data reported are parts by weight, the amount used of the mixture of the three components is 1% (except for example 15), based on dry weight of the mineral components.
Methylcellulose in this content means a Methylhydroxycellulose. The following starting materials were used: as methylcellulose in all examples: Walocel M-20678 (Wolff Cellulosics GmbH, Germany), viscosity at 20° C., 2% aqueous solution, Haake rotary viscometer, 75-85 000 mPas according to specification; as superplasticizer in examples 2, 3, 5 to 8, 17 and 18: Melflux 2651 F (Degussa, Germany), in example 16 melamine sulphonate, as defoamer in examples 9 and 10: defoamer T (= tributyl phosphate, Bayer AG, Germany), in examples 11 and 12: Rhoximat DF 770 DD (Rhodia), in examples 2, 3, 5-8, 13 and 14: Agitan P 803 (Münzing Chemie, Germany).
W/S means the water/solids factor. The amount of water used is calculated only on the amount of sand and cement; fibers and additives are not taken into account. For example, a W/S of 0.29 means that 29 g of water are used for 100 g of sand and cement.
Pressure means the pressure measured just upstream of the die. The value is averaged over at least six measurements.
Exit rate of the extruded composition from the die.
Expansion in the width based on the width of the die (=100%).
The stiffness of the composition is tested on the freshly extruded samples. It is a measure of the consistency of the sample. If a composition is discharged too stiff, the higher friction of the particles against one another and at the extruder walls lead to a higher power consumption, to increased wear and to heating of the composition; if the composition is discharged too soft, it is dimensionally unstable. This leads, in the extrusion of hollow profiles, to deformation of the ridges, but in principle because of the higher W/S value, to lower strengths. Cohesion means the inner cohesion of the freshly extruded sample. A good cohesion shows, for example, that the extruded profile, on bending/twisting, shows no cracks or fewer cracks than customary, and a much greater expenditure of force is necessary on pulling apart (by hand) the freshly extruded and still plastic sample as is the case for samples not extruded according to the invention. Strengths measured after 28 d of storage under the following conditions: 2 d at 23 +/− 2° C. in welded polyethylene bags at room temperature in a steel press of height 40 mm, further 5 d under the same conditions outside the press, then 21 d at 23 +/− 2° C. and 50 +/− 5% relative humidity.
Ratio 1 (R 1) means the ratio cellulose ether: polycarboxylate ether superplasticizer (based on powder):defoamer
Ratio 2 (R 2) polycarboxylate ether superplasticizer in % by weight, based on cement.
Ratio 3 (R 3) means the ratio of cellulose ether in % by weight, based on cement.
Ratio 4 (R 4) means the ratio between polycarboxylate ether superplasticizer and cellulose ether between 100:0 and 0:100.
Ratio 5 (R 5) means the ratio of defoamer in % by weight, based on cellulose ether.
Further notes:
Abbreviations: n.d.: not determined, n.m.d. = not meaningfully determinable
The temperature of the extruded compositions was in all cases between 37 and 44° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cellulose ether composition comprising (A) 55-99.8% by weight of a cellulose ether having a viscosity between 75,000 and 200,000 mPas, measured in a 2% aqueous solution at 20° C. in a Haake rotary viscosimeter, (B) 0.19-45% by weight of a superplasticizer and (C) 0.01-25% by weight of a defoamer, the percents being relative to the weight of the cellulose composition.

2. The cellulose ether composition according to claim 1, wherein the cellulose ether (A) is at least one member selected from the group consisting of carboxymethylcellulose and sulphoethylcellulose and salts of each.

3. The cellulose ether composition according to claim 1, wherein cellulose ether (A) is at least one member selected from the group consisting of methylcellulose, methylhydroxyethylcellulose, methylhydroxypropylcellulose, hydroxyethylcellulose, hydroxypropylcellulose, ethylhydroxyethylcellulose, methylethylhydroxyethylcellulose, methylhydroxyethylhydroxybutylcellulose and cellulose ethers which contain methyl groups and longer-chain hydrophobic side chains.

4. The cellulose ether composition according to claim 1, wherein the superplasticizer is a synthetic polymer, comprising polymerized units of an unsaturated monomeric carboxylate ether, carboxylic acid ester and/or carboxylic acid and/or a salt of carboxylic acid.

5. The cellulose ether composition according to claim 1, wherein the defoamer is a member selected from the group consisting of alkylene glycol homopolymers, alkylene glycol copolymers, alkylene glycol terpolymers, block copolymers based on ethylene oxide and block copolymers based on propylene oxide.

6. The cellulose ether composition according to claim 1 in powder form.

7. The cellulose ether composition according to claim 1 comprising (A) 60-99% by weight of the cellulose ether, (B) 0.9-39.9% by weight of the superplasticizer and (C) 0.1-20% by weight of defoamer, the percents being relative to the weight of the cellulose ether composition.

8. The cellulose ether composition according to claim 1, wherein the cellulose ether has a viscosity between 75,000 and 85,000, measured in a 2% aqueous solution at 20°C. in a Haake rotary viscosimeter.

9. The cellulose ether composition according to claim 8 comprising (A) 60-99% by weight of the cellulose ether, (B) 0.9-39.9% by weight of the superplasticizer and (C) 0.1-20% by weight of defoamer, the percents being relative to the weight of the cellulose ether composition.

10. A process for making articles by extrusion comprising mixing a cellulose ether composition comprising (A) 55-99.8% be weight of aqueous solution at 20° C. in a Haake rotary viscosimeter, (B) 0.19-45% by weight of a superplasticizer and (C) 0.01-25% by weight of a defoamer, the percents being relative to the weight of the cellulose ether composition, with water and a mineralic mixture comprising 20 to 100 parts of binder, 0 to 70 parts of aggregates, 0 to 30 parts of lightweight aggregates, 0 to 20 parts of fibres and optional additives, to produce a homogeneous composition and extruding the homogeneous composition through a die of an extruder, said cellulose ether composition being present in an amount of 0.1 to 3 percent relative to the mineralic mixture.

11. The process according to claim 10, wherein the cellulose ether composition comprises (A) 60-99% by weight of the cellulose ether, (B) 0.9-39.9% by weight of the superplasticizer and (C) 0.1-20% by weight of the defoamer, the percents being relative to the weight of the cellulose ether composition.

12. The process according to claim 10, wherein the cellulose ether has a viscosity between 75,000 and 85,000, measured in a 2% aqueous solution at 20°C. in a Haake rotary viscosimeter.

13. The process according to claim 12, wherein the cellulose ether composition comprises (A) 60-99% by weight of the cellulose ether, (B) 0.9-39.9% by weight of the superplasticizer and (C) 0.1-20% by weight of defoamer, the percents being relative to the weight of the cellulose ether composition.

14. An inorganic extrusion composition comprising a mineralic mixture comprising 20 to 100 parts by weight (pbw) of binder, 0 to 70 pbw of aggregates, 0 to 30 pbw of lightweight aggregates, 0 to 20 pbw of fibers and optional additives, and 0.1 to 3% by weight (based on the weight of the mineralic mixture) of a cellulose ether composition comprising (A) 55-99.8% by weight of a cellulose ether having a viscosity between 75,000 and 200,000 mPas, measured in a 2% aqueous solution at 20° C. in a Haake rotary viscosimeter, (B) 0.19-45% by weight ofa superplasticizer and (C) 0.01-25% by weight of a defoamer, the percents being relative to the weight of the cellulose ether composition.

15. The inorganic extrusion composition according to claim 14, wherein the binder is cement, the amount of superplasticizer is 0.01 to 4% by weight and the amount of cellulose ether is 0.05 to 10% by weight, in each case based on the weight of said cement.

16. The inorganic extrusion composition according to claim 14, wherein the cellulose ether composition comprised in the inorganic extrusion composition comprises (A) 60-99% by weight of the cellulose ether, (B) 0.9-39.9% by weight of the superplasticizer and (C) 0.1-20% by weight of defoamer, the percents being relative to the weight of the cellulose ether composition.

17. The inorganic extrusion composition according to claim 14, wherein the cellulose ether has a viscosity between 75,000 and 85,000, measured in a 2% aqueous solution at 20° C. in a Haake rotary viscosimeter.

18. The inorganic extrusion composition according to claim 17, wherein the cellulose ether has a viscosity between 75,000 and 85,000, measured in a 2% aqueous solution at 20° C. in a Haake rotary viscosimeter.

* * * * *